United States Patent [19]
Lusk

[11] 3,738,684
[45] June 12, 1973

[54] TRANSPORTABLE VEHICLE

[76] Inventor: Grady L. Lusk, Route 6, Canton, Ga. 30114

[22] Filed: Sept. 17, 1971

[21] Appl. No.: 181,462

[52] U.S. Cl............ 280/491 R, 9/1 T, 280/414 A, 280/491 A, 280/491 B
[51] Int. Cl............................................. B60d 1/14
[58] Field of Search .......................... 9/1 R, 1 T; 115/.5 R, .5 A; 280/414 A, 414 R, 414 B, 491 A, 491 B, 491 D, 482, 477, 478, 493, 486–490, 498, 499; 105/389; 211/170–173, 177, 178; 213/63

[56] References Cited
UNITED STATES PATENTS

| | | | |
|---|---|---|---|
| 2,918,310 | 12/1959 | Carson | 280/491 B X |
| 3,210,783 | 10/1965 | Petty | 9/1 T |
| 1,308,039 | 7/1919 | Cadman | 280/482 |
| 2,474,296 | 6/1949 | Wiltsee | 280/490 R |

FOREIGN PATENTS OR APPLICATIONS 1,034,034  6/1966  Great Britain ................... 115/.5 A Primary Examiner—Milton Buchler
Assistant Examiner—E. R. Kazenske
Attorney—Van C. Wilks

[57] ABSTRACT

This disclosure relates to a transportable vehicle comprising a vehicle body and a trailer frame assembly. The trailer frame assembly includes an extensible draft bar that may be pivoted from a generally horizontal position where it is adapted to be connected to a draft vehicle, to an inclined position folded-up against the vehicle body so that it is out of the way when so desired.

3 Claims, 8 Drawing Figures

INVENTOR
GRADY L. LUSK

BY *Van C. Wilks*
ATTORNEY

TRANSPORTABLE VEHICLE

This invention relates generally to the transportation art, and more particularly to a combination vehicle and trailer frame assembly having novel features of construction which facilitate its adaptation to various forms of transportation. In addition to its usefulness as a towing implement for transportable vehicles in general, the trailer frame assembly of this invention is particularly adaptable in combination with small boats to provide an amphibious vehicle which may be drawn over ground by a draft vehicle, as well as facilitating fast and simple conversion thereof into a water-going craft wherein the trailer frame portions of the vehicle are retracted or removed so as not to impede the navigational capability of the boat.

As the amount of leisure time increases, more and more people are turning to water sports as a desirable form of recreational activity. The attraction of water skiing, fishing and general boating has stimulated the market for small boats to all-time highs. However, the finacial and logistical problems of storing and maintaining a boat are sometimes too great for the average family. If the boat is adapted to be docked in the water, the cost for dock space, especially in the more congested areas, is increasingly prohibitive. On the other hand, transporting the boat over land from its storage space to the water by means of a trailer necessitates, of course, the purchase of a trailer, and also involves the problems inherent in detaching the boat from the trailer prior to lowering it into the water as well as the problems in remounting it onto the trailer.

It is, therefore, a primary object of this invention to provide an amphibious vehicle having novel features facilitating both land and water use.

More particularly, it is an object of this invention to provide a combination boat and trailer frame assembly which facilitates ground travel of the vehicle behind a draft vehicle, as well as fast and simple conversion thereof into a boat adapted for water travel wherein the trailer frame portions are retracted or removed so as not to impede its navigational capability.

A further object of this invention is to provide an amphibious vehicle having ground running wheels received in sockets in the bottom of the vehicle that may be released and removed when the vehicle is in water.

Another object of this invention is to provide a transportable vehicle comprising a vehicle body and trailer frame assembly having an extensible draw bar pivotally mounted on the frame and movable from a generally horizontal position to an inclined position folded-up against the vehicle body.

Still another object of this invention is to provide an extensible draw bar for a transportable vehicle comprising fixed guide channel bars having a C-shaped configuration in cross-section, and a beam portion having an I-shaped configuration in cross-section slidable relative to the fixed bars and supported thereby.

With the above and other objects in view that may hereinafter appear, the invention may be more clearly understood by reference to the several views illustrated in the accompanying drawings, the following detailed description, and the appended claimed subject matter.

IN THE DRAWINGS

Figure 6:
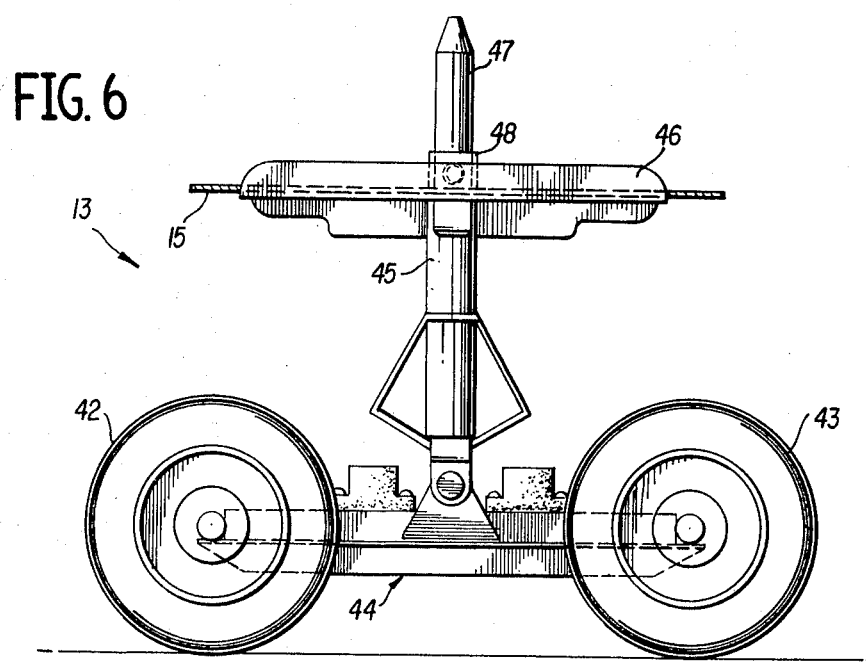
Figure 7:
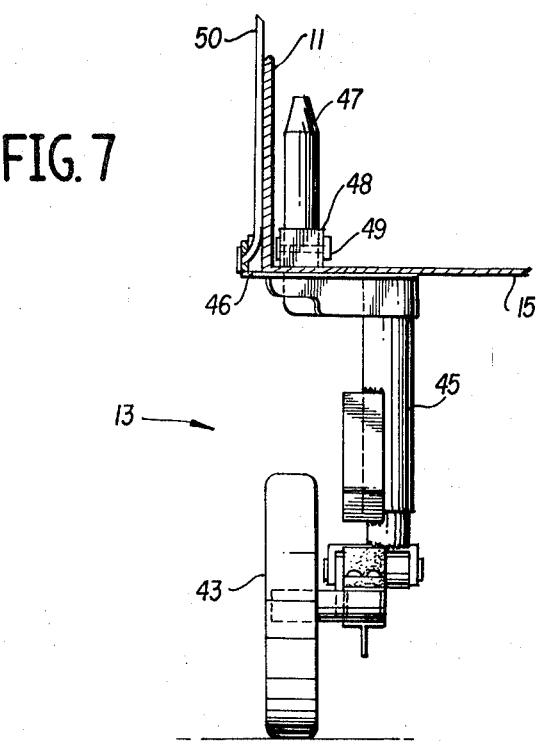
Figure 8:
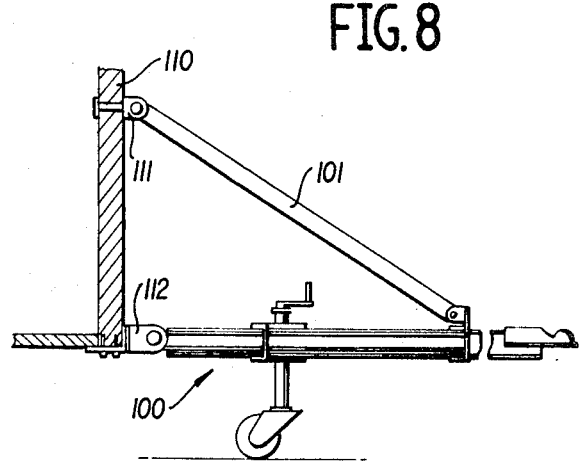

FIG. 6 is an elevation view of a rear running wheel assembly of the amphibious vehicle of this invention, and illustrates a mounting stud of the assembly extending into a socket in the bottom of the boat; and FIG. 7 is a fragmentary end elevation view illustrating further details of one of the running wheel assemblies and the attached belt by means of which the assembly may be drawn out of the water when detached from the boat; and FIG. 8 is an elevation view of an alternate embodiment of the invention, and illustrates a modified trailer frame assembly attached to a mobile home and adapted to facilitate transportation thereof.

Figure 1:
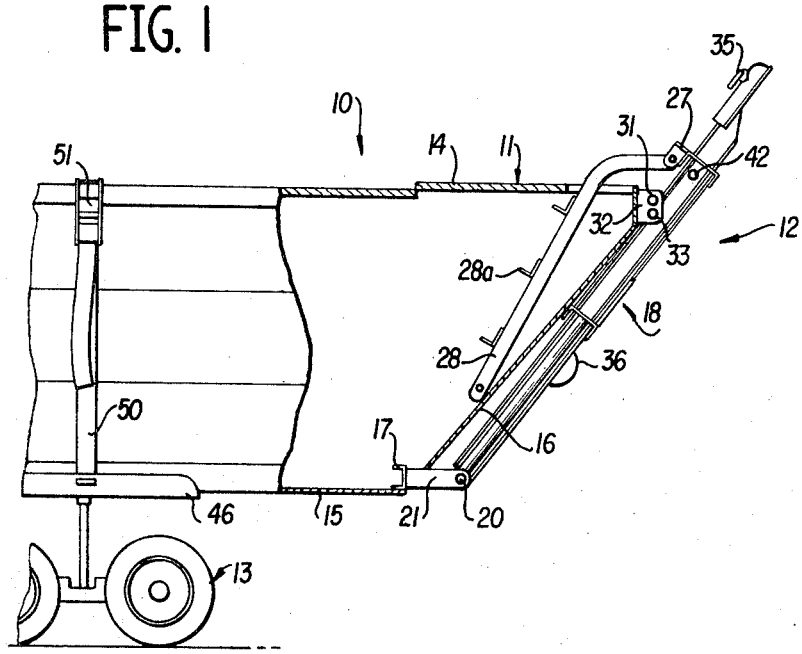
FIG. 1 is a fragmentary elevation view, having portions cut away for clarity, of an amphibious vehicle constructed in accordance with the invention, and illustrates the draw bar folded-up against the bow of the boat.

Referring now to the drawings in detail, there is illustrated in FIG. 1 an amphibious vehicle designated generally by the numeral 10. The vehicle 10 includes a boat 11 having a trailer frame assembly 12 suitably attached thereto. The boat 11 carries two sets of rear running wheel assemblies 13 (only one set illustrated in FIG. 1) by means of which the vehicle 10 is adapted for land travel.

The boat 11 may be of any conventional type, but for purposes of illustration is depicted as a simple shallow draft type having an upper deck 14, a flat bottom 15, and an inclined planar bow 16.

The trailer frame assembly 12 includes a transverse mounting channel bar 17 by means of which the assembly 12 is secured to the boat 11. The channel bar 17 is fastened to the boat 11 by any suitable means such as welding, in the case of a metal boat, or through bolts in the case of wooden or fibreglass boats.

Figure 3:
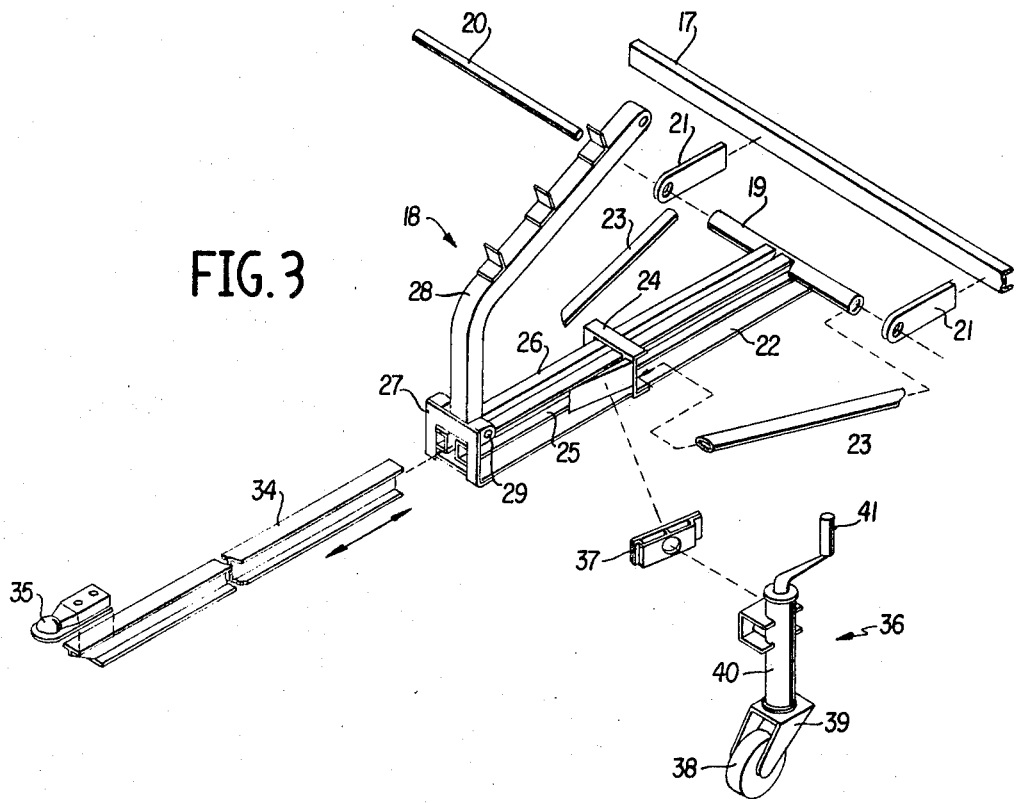
FIG. 3 is an exploded perspective view of the frame assembly of this invention.
Figure 4:
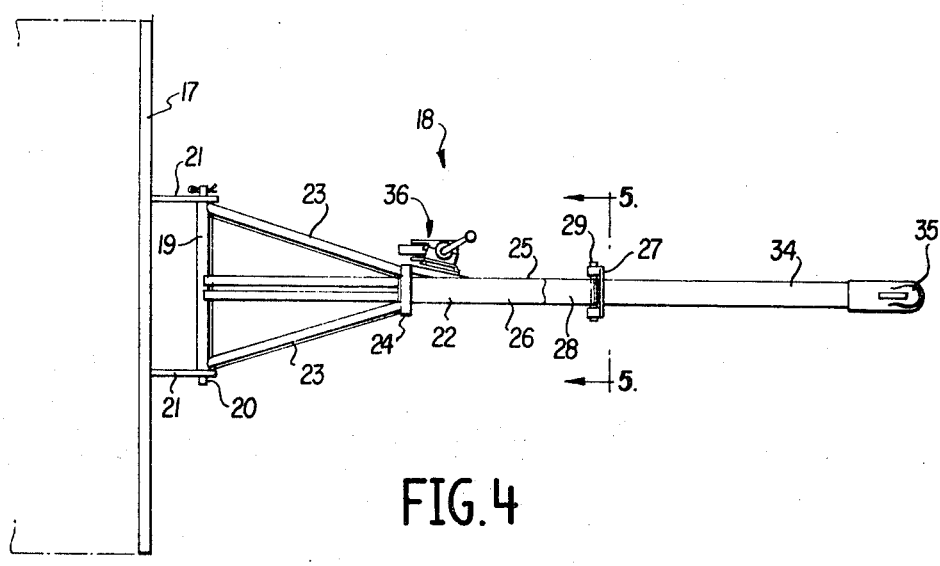
FIG. 4 is a plan view of the frame assembly, and illustrates the draw bar in lowered and extended condition.

The trailer frame assembly 12 also includes an extensible hitch or draw bar assembly 18 which is pivotably secured to the channel bar 17 by means of a sleeve 19 and a pin 20 which extends through brackets 21 carried by the channel bar 17. As seen most clearly in FIGS. 3 and 4, the draw bar assembly 18 includes an axially fixed portion 22 which is secured to the sleeve 19 and supported by rods or tubes 23 connected to a bracket 24.

Figure 2:
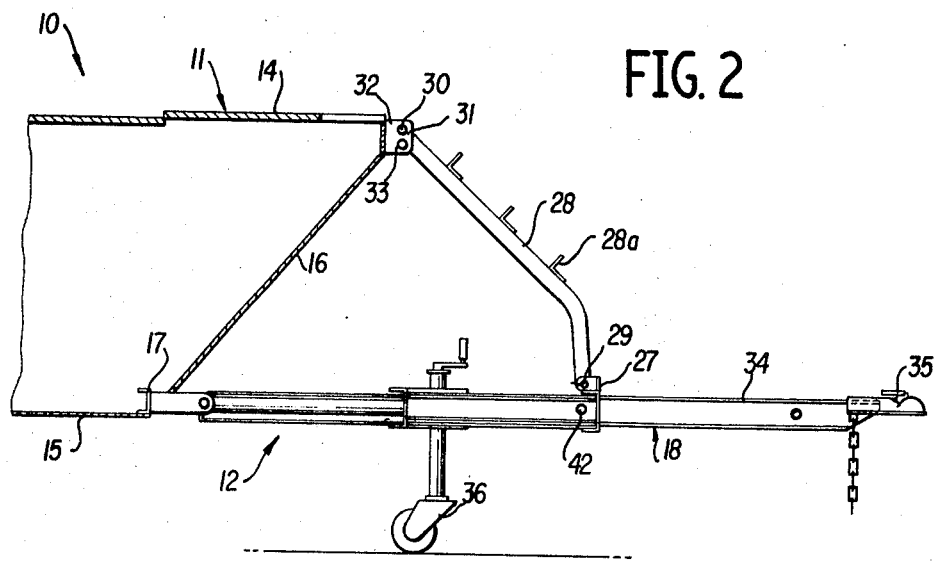
FIG. 2 is a fragmentary elevation view similar to FIG. 1, having portions cut away for clarity, and illustrates the draw bar lowered and extended and adapted to be connected to a draft vehicle.
Figure 5:
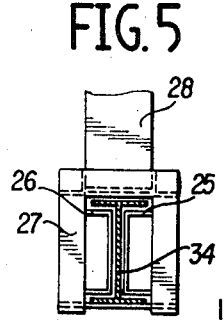
FIG. 5 is a sectional view taken along line 5—5 of FIG. 4, and illustrates the fixed C-channel bar guides and the I-beam slidable therebetween.

The axially fixed portion 22 of the draw bar assembly 18 also includes two fixed channel bars 25, 26 which extend from the sleeve 19 to a front bracket 27. As seen most clearly in FIG. 5, the channel bars 25, 26 have a C-shaped configuration in cross-section and are disposed back-to-back with their openings facing in opposite directions. A slightly bent support strut 28 having foot steps 28a is pivotally secured at one end thereof to the front bracket 27 by means of a pin 29. As seen in FIG. 2, the support strut 28 may be secured at its other end to the boat 11 by means of a pin 30 extending through a first hole 31 in a bracket 32 suitably fastened to the boat 11. The bracket 32 also includes a second hole 33 by means of which the draw bar assembly 18 may be secured in its folded-up condition, as seen in FIG. 1, in a manner to be hereinafter described.

Referring once again most particularly to FIG. 3, it can be seen that the draw bar assembly 18 also includes an extensible tongue or beam portion 34 which is slidable relative to the axially fixed portion 22. As seen most clearly in FIG. 5, the extensible beam portion 34 has an I-shaped configuration in cross-section and is adapted to slide between the oppositely-facing C-shaped channel bars 25, 26 which provide vertical and transverse support therefor. The tongue or beam portion 34 carries a hitch member 35 by means of which the vehicle 10 may be connected to a draft vehicle.

The draw bar assembly 18 also carries a front running wheel assembly 36 that is pivotally secured thereto by means of a mounting plate 37. The wheel assembly 36 includes a ground-engaging wheel 38 carried by a yoke 39 attached to an axle sleeve 40. A handle 41 is provided to steer the wheel 38 when desired. Suitable means (not shown) interacting with the mounting plate 37 are provided for rotating the wheel assembly 36 from a vertical ground-engaging position as illustrated in FIG. 2, to its folded-up position aligned with the draw bar assembly 18 as illustrated in FIG. 1.

The operation of the draw bar assembly 18 should be readily apparent in view of the foregoing description. When it is desired to transport the vehicle 10 over land, the draw bar assembly 18 is disposed in its lowered and extended condition as seen in FIG. 2 with the support strut 28 secured to the bracket 32 by means of the pin 30 inserted through the first hole 31. The tongue or beam portion 34 may be fixed in its extended position by any suitable means such as a pin 42 inserted through aligned openings in the channel bars 25, 26 and the I-beam 34. The wheel assembly 36 is fixed in its vertical position generally perpendicular to the draw bar assembly 18. The vehicle 10 is thus adapted to be connected by means of the draw bar assembly 18 to a draft vehicle for transportation to or from a desired body of water.

When it is desired to convert the vehicle 10 from a land-traveling vehicle to a boat adapted for water travel, the draw bar assembly is simply retracted and folded-up against the bow 16 of the boat 11, as seen in FIG. 1, where it is secured and thus stowed in an out-of-the-way position. In order to accomplish this operation, the pin 42 is first removed and the I-beam portion 34 retraced to a fully closed position. The beam portion 34 may be secured in this position by reinserting the pin 42 through the aligned holes in the channel bars 25, 26 and another appropriate hole in the I-beam 34. The wheel assembly 36 is then rotated and secured in a position aligned with draw bar assembly 18. The support strut 28 is then released by removing the pin 30, and the draw bar assembly 18 is then rotated about the pin 20 until it is folded-up in an inclined position against the bow 16 of the boat 11 as seen in FIG. 1. A portion of the deck 14 extending rearward from the bow 16 is cut away to accommodate receipt of the disengaged support strut 28 within the interior of the boat 11. The bend in the strut 28 permits it to extend back towards the inside of the bow 16 and thus be out of the way in the boat 11. The draw bar assembly 18 may be fixed in its folded-up condition by inserting a pin through the second hole 33 in the bracket 32 which may be aligned with suitable retaining holes in the draw bar assembly 18.

Turning now to FIGS. 6 and 7, there are illustrated details of one of the two sets of rear running wheel assemblies 13 which are disposed approximately midship on opposite sides of the boat 11. Each wheel assembly 13 includes two ground engaging wheels 42, 43 carried on a support arm assembly 44 which depends on a hanger rod assembly 45 from the bottom 15 of the boat 11.

The wheel assembly 13 is releasably secured to the boat 11 by means of a mounting plate 46 which extends along the bottom 15 and over one side of the boat 11. The mounting plate 46 carries a stud 47 which extends through a hole in the bottom 15 and is received within a socket defined by a bushing 48. The wheel assembly 13 is fixed in its mounted position by means of a pin 49 which may be extended through aligned holes in the bushing 48 and stud 47.

The wheel assemblies 13 may be removed from the vehicle 10 when the boat 11 is actually in the water. The pin 49 is first removed and the wheel assembly 13 dropped out of the socket formed by the bushing 48 under the force of its own weight. The socket is then closed by any suitable means such as a rubber plug. The wheel assembly 13 may then be drawn into the boat 11 by means of a webbed belt 50 (FIGS. 1 and 7) which is attached at one end to the mounting plate 46 and at the other end to a buckle 51 secured to the deck 14 of the boat 11. As seen in FIG. 1, when the wheel assembly 13 is in its mounted position the belt 50 is pulled tight through the buckle 51. However, when the wheel assembly 13 is released, the buckle 51 must be unfastened and a sufficient length of belt 50 passed therethrough to accommodate the length of the stud 47 dropping through the bushing 48. Once the stud 47 has cleared the bottom 15 of the boat 11, the entire wheel assembly 13 may be pulled into the boat 11.

In view of the foregoing, it should be apparent that there is provided in accordance with this invention a novel amphibious vehicle that is readily convertible from land to water use. The combined boat and trailer frame assembly avoids the requirement of a separate trailer for land travel, while the concept of providing removable rear running wheels and a retractable fold-up draw bar prevents these elements from impeding the navigational capability of the boat in water.

An alternate embodiment of the invention is illustrated in FIG. 8. A trailer frame assembly 100, having a modified support strut 101 but otherwise being identical to the trailer frame assembly 12, is adapted to be connected to a mobile home 110. The mobile home 110 is provided with brackets 111, 112 by means of which the trailer frame assembly 100 may be attached thereto. In this manner, a mobile home moving company having a tractor provided with the trailer frame assembly 100 could hook-up to transportable structures such as the mobile home 110 and transport it as desired, thereafter simply unhooking the trailer frame assembly 100 and freeing it for other duty.

Although only preferred embodiments of the invention have been specifically illustrated and described herein, it is to be understood that minor variations may be made without departing from the spirit of the invention.

I claim:

1. A draw bar assembly comprising a fixed portion and an extensible portion slidable relative thereof, said fixed portion including two channel bars having a C- shaped configuration in cross-section, said C-shape thereby inherently forming an opening on one side of said channel bars, said extensible portion including a beam having an I-shaped configuration in cross-section, said channel bars being disposed back-to-back with their openings facing in opposite directions, and said beam being adapted to slide axially between said channel bars, the web of said I-beam slidably engaging the backs of the said channel bars.

2. A draw bar assembly as defined in claim 1 wherein said channel bars provide transverse and vertical support for said beam.

3. A transportable vehicle comprising a vehicle body and trailer frame assembly, said trailer frame assembly including a draw bar assembly extensible between a fully opened and fully closed position, said draw bar assembly being pivotally mounted on said trailer frame and movable from a generally horizontal position where it is adapted to be connected to a draft vehicle to an inclined position folded-up against said transportable vehicle body, said draw bar assembly comprising a fixed portion and an extensible portion slidable relative thereof, said fixed portion including two channel bars having a C-shaped configuration in cross-section, said C-shape thereby inherently forming an opening on one side of said channel bars, said extensible portion of said draw bar assembly including a beam having an I-shaped configuration in cross-section, said channel bars being disposed back-to-back with their openings facing in opposite directions, and said beam being adapted to slide axially between said channel bars, the web of said I-beam slidably engaging the backs of said channel bars.

* * * * *